Aug. 28, 1956     H. H. McADAM     2,760,348
MOTOR-COMPRESSOR IN PLURAL TEMPERATURE REFRIGERATING SYSTEM
Filed Aug. 5, 1952     5 Sheets-Sheet 1
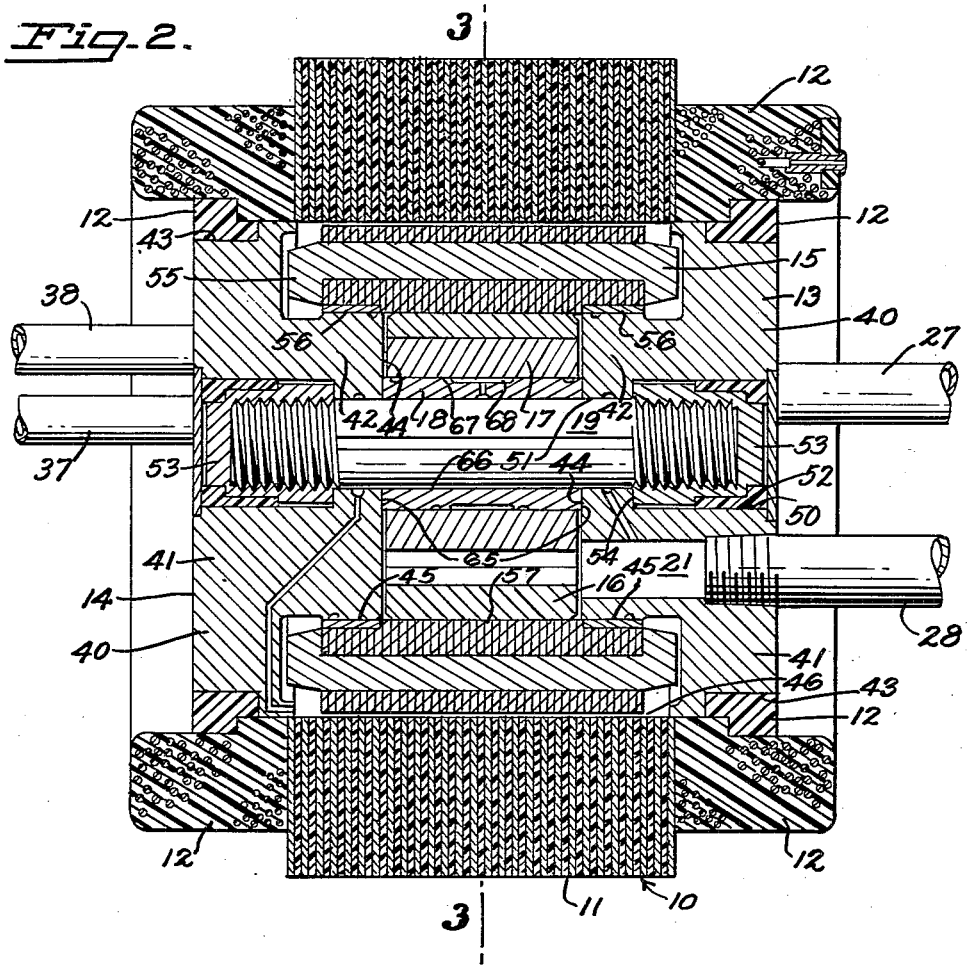
*INVENTOR.*
HARRY H. McADAM
BY
*ATTORNEY*

Aug. 28, 1956　　　H. H. McADAM　　　2,760,348
MOTOR-COMPRESSOR IN PLURAL TEMPERATURE REFRIGERATING SYSTEM
Filed Aug. 5, 1952　　　　　　　　　　　　　5 Sheets-Sheet 2

INVENTOR.
HARRY H. McADAM
BY
ATTORNEY

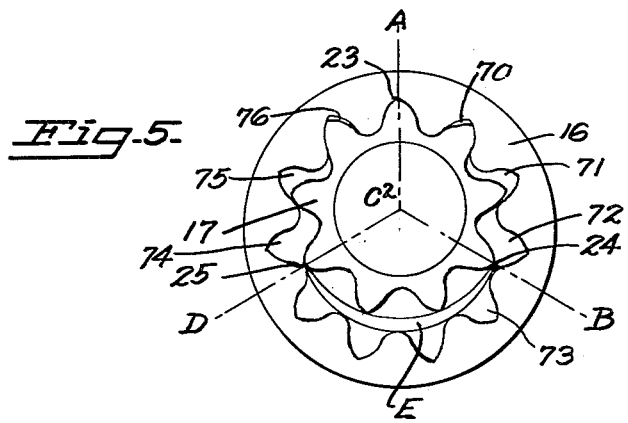
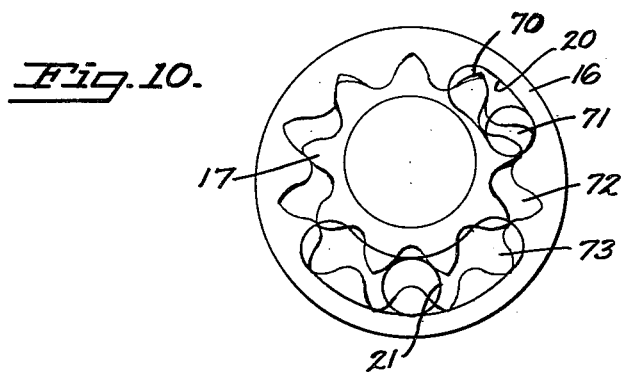
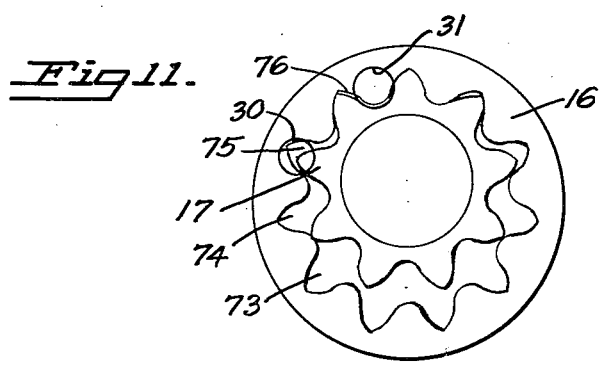

Aug. 28, 1956 — H. H. McADAM — 2,760,348
MOTOR-COMPRESSOR IN PLURAL TEMPERATURE REFRIGERATING SYSTEM
Filed Aug. 5, 1952 — 5 Sheets-Sheet 4
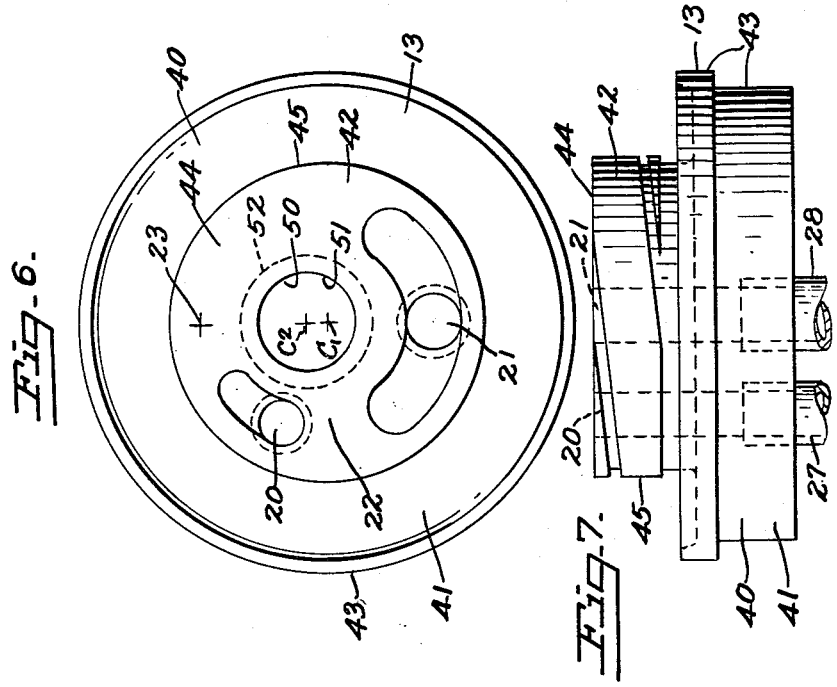
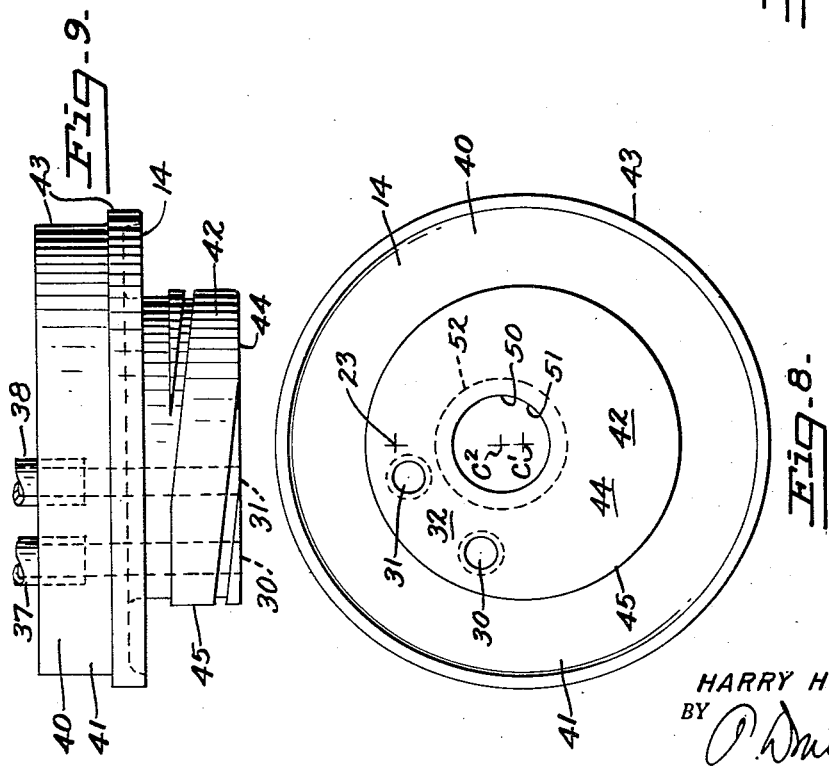
INVENTOR.
HARRY H. McADAM
BY
ATTORNEY

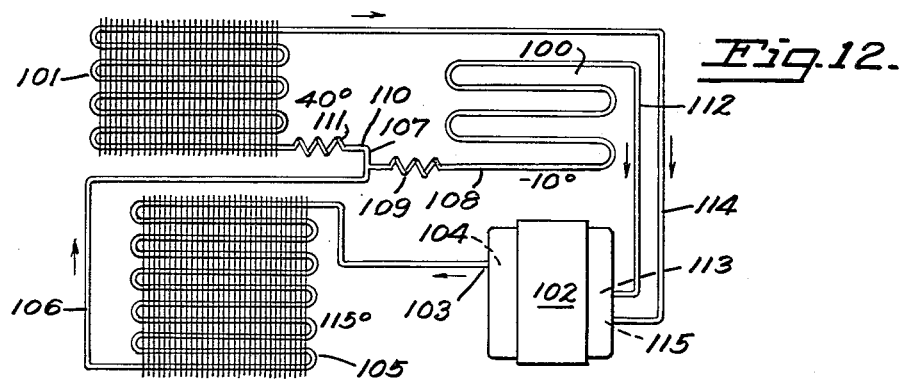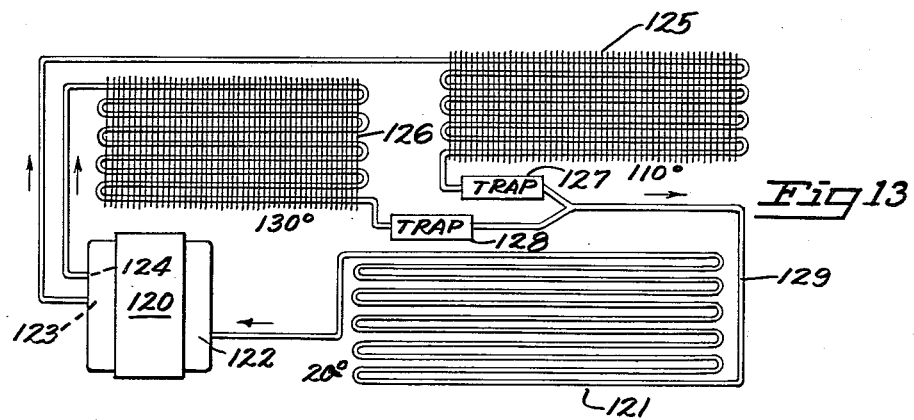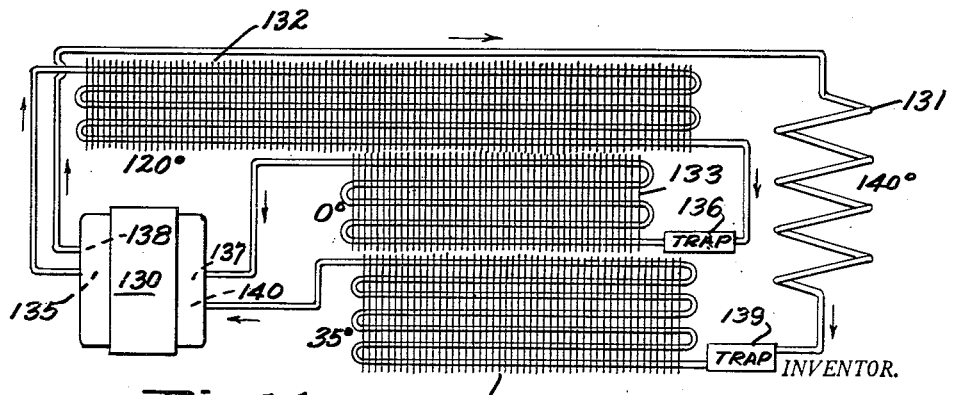

United States Patent Office 2,760,348
Patented Aug. 28, 1956

2,760,348

MOTOR-COMPRESSOR IN PLURAL TEMPERATURE REFRIGERATING SYSTEM

Harry H. McAdam, San Carlos, Calif., assignor to Wetmore Hodges, Redwood City, Calif.

Application August 5, 1952, Serial No. 302,753

19 Claims. (Cl. 62—117.3)

This invention relates to an improved motor-compressor of the positive displacement type, such as is shown in my co-pending applications Serial No. 279,392, filed March 29, 1952, Serial No. 286,880, filed May 9, 1952, now Patent No. 2,693,313, dated November 2, 1954, and Serial No. 302,099, filed August 1, 1952, now Patent No. 2,711,286, dated June 21, 1955.

This invention solves many problems which have long confronted the compressor industry, particularly in relation to such applications as domestic refrigerators having freezer compartments, home air conditionsrs, water coolers, and other refrigerating or heating devices employing compressors.

One of the basic problems solved by the present invention is the obtaining of two entirely different and separate temperatures from one small motor-compressor. Small powerful motor-compressors have long been sought after, because space is always at a premium. Every cubic inch of space taken up by the power unit subtracts from the cabinet space that can be made available to the consumer. Therefore, it has been doubly attractive to employ only one compressor even when two temperatures are required.

Some examples will serve to illustrate the problem. A large number of refrigerators now on the market provide two separated compartments which are kept at two different temperatures. For example, the freezing compartment may be kept at about minus 10° F. while the general food storage compartment may be held at about 40° F. At the present time both of these storage compartments are operated from a single compressor, but, in order to do so with compressors heretofore in use, it has been necessary to employ suitable accessory control devices or valves. The compressor was adjusted to provide the lower temperature, in this case minus 10° F. while the higher temperature was provided at a penalty because of the accessory control valve.

Another application of a two-temperature device most desirably operated from one compressor, is a dual-purpose office-type water cooler where drinking water is chilled to about 50° while, at the same time, ice cubes are made at about 20°. Again the prior art has obtained this result by the use of accessory control valves.

A third example of a two-temperature system is a food display case of the type in which there is a fresh vegetable display operating at about 40° F. along with a frozen food display operating at about 0° F. Again, where a single compressor was used, the prior art had to rely on accessory control valves.

A fourth example is a soda fountain in which there is an ice cream storage cabinet maintained at about minus 10° F. while the plain and carbonated water are cooled to about 40° F. As in the preceding examples, the prior art has provided suitable control valves at the evaporator for the water cooler in order to prevent it from freezing the water.

The present invention has solved this problem without the use of any valves whatever by a novel plural-ported motor compressor of the positive displacement type. Whereas the prior art compressors have required compressor intake valves, compressor discharge valves, and in addition have required the two-temperature control valves referred to above, the motor compressor of this invention does not require any of these valves.

One thing that makes the present invention possible is the availability of pumping elements which provide a continuous uninterrupted overlapping pumping action. The best known pumping elements of this type are the so-called "Rotoid" rotors, the name "Rotoid" being a trademark and also being an identification of the type of pumping element described and claimed in Patent #2,547,392, issued April 3, 1951, to Myron F. Hill and Francis A. Hill, II. Other patents issued to one or both of these same inventors also describe similar pumping elements which may be used in the present invention. In addition to the Rotoid pump elements, the present invention also employs as stated earlier, the principles disclosed in my co-pending applications, Serial Nos. 279,392, 286,880, and 302,099. In place of Rotoid pumping elements, Gerotor elements, described in other patents by the Hills, or multi-vane rotary elements may be used, but Rotoid elements appear to give the most satisfactory results.

Basically, the present invention employs plural-porting which may be plural-intake-porting, plural-discharge-porting, or both, in connection with the aforesaid positive displacement compressor.

This invention solves the problem of two-temperature refrigeration in the simplest and least costly manner without the need for the usual accessory control valve, and without the usual intake and discharge compressor valves. In this invention the compressor intake is divided into two separate chambers. The second chamber is displaced angularly from the first chamber, the second chamber being moved further away from the seal line (point of full mesh) of the rotating pumping elements. During rotation, a given cavity confined between the teeth of the pumping gears will fill with suction vapor while passing over the first intake port. As it leaves the first port, the cavity continues to expand as it is rotated over the distance separating the second intake port from the first port; therefore, it will accept additional suction vapor when it passes over the second port. At no time are the respective suction ports interconnected, their separation affording the means of creating two separate and different suction pressures. Various vapor volume ratios and pressure differences between the suction ports can be achieved by changing the relative shape, area, and angular position of either or both suction ports. Since the pressure of the vapor within the respective suction ports is controllable and since the volume of vapor entering each of these ports is also controllable, the respective intake pressures and volumes may be utilized to the desired purpose. When two suitable evaporators are separately connected to the conduits leading into respective suction ports, the temperatures of the evaporators can be different. No valves are required by either port, and further, no suction pressure control valve is required by either of the two evaporators served by this plural-ported, positive displacement, motor-compressor.

The plural suction porting of this invention also appreciably improves the coefficient of performance of the compressor. In general it can be said that the coefficient of performance decreases as the temperature difference between the hot and cold sides of a refrigeration system increases. In other words, more power is required to transfer a given quantity of heat where the temperature levels are more widely separated than where the temperature levels are more nearly the same. In conventional two-temperature refrigeration systems served by one compressor, the compressor has had to be adjusted to provide a suction pressure commensurate with the lowest temperature evaporator. Due to this requirement, a suction pressure control valve interposed between the higher temperature evaporator and the compressor penalizes the system as a whole. This valve prevents the higher suction pressure from entering the compressor directly, as it reduces this high pressure to match the lower pressure required by the coldest evaporator. It follows that all vapor entering a compressor so adjusted will therefore do so at the pressure-equivalent of the lowest temperature.

To illustrate, a conventional single compressor, two-temperature refrigeration system using Freon-12 as a refrigerant and having a 40° general storage compartment in addition to a minus 10° freezer compartment, would of necessity require a suction pressure control valve, or its equivalent, for the 40° compartment. The evaporator for this compartment would operate at a pressure of about 40 pounds per square inch absolute. The evaporator for the freezer would operate at about 15 p. s. i. a. As we have already seen, the suction pressure control valve is used to prevent the 40 pound pressure of the general storage evaporator from falling to 15 p. s. i. a. Vapor entering this valve at 40 p. s. i. a. leaves it at 15 p. s. i. a; therefore, the total volume of vapor from both evaporators enters the compressor at 15 pounds. Assuming a 90° ambient temperature, the compressor must raise 15 p. s. i. a. suction vapor to 146 p. s. i. a. to effect condensation, a pressure difference of 131 pounds for the total volume pumped.

However, when the plural suction-ported motor-compressor of this invention is used, full advantage can be taken of that portion of the total vapor volume load which leaves the 40 pound evaporator, because it enters the compressor directly. No suction pressure control valve is interposed; therefore, there is no reduction of pressure. If, for example, this 40 pound evaporator represents one-half the total heat load for the system, then the compressor would raise this portion of the total load from 40 to 146 pounds, a difference of 106 pounds. The remaining one-half would still be raised from 15 to 146 pounds, a difference of 131 pounds. It will be clearly seen that less work is done by a compressor where one-half the load is raised 106 pounds and the remaining one-half raised 131 pounds, than in a conventional system where the entire load is raised 131 pounds. It follows that since the coefficient of performance is the ratio of the energy consumed by the compressor to the energy transferred by it, a refrigeration system wherein the largest energy transfer occurs at the smallest energy consumption would have the highest coefficient of performance, and this will be the case where no valves are used.

The unique advantages gained by the use of plural intake porting apply equally to plural discharge porting of this invention. Further, plural discharge ports operating simultaneously in the same compressor will not change or modify the performance characteristics of the plural intake ports. In short, the motor-compressor of this invention will operate successfully with plural intake ports, or with plural discharge ports, or will operate simultaneously with both plural intake and plural discharge ports. Further, it will do any one, or all of these things without any compressor valves of any kind. The unique plural porting of this invention achieves a service new to the art by providing two separate and different intake pressures, two separate and different intake volumes, or both. Simultaneously, the invention may or may not provide two separate and different discharge pressures or volumes. These several and unusual compressor performance functions may be used to provide two separate and different cooling temperatures or two separate and different heating temperatures or both in two-temperature refrigerators or two-temperature so-called "heat pump," heating systems or other places.

One application of plural discharge ports is the so-called "heat pump," wherein a vapor compression machine is used as the means to provide residential home heating in winter. In this case the hot, superheated discharge vapor is piped to suitable radiators (condensers) throughout the house. The condensate (liquid refrigerant) is piped outside to suitable expansion evaporators of either the atmospheric or underground type where low temperature heat is absorbed. Compression raises this low temperature heat to high temperature heat which heats the home. The plural discharge ports of this invention provide the means to heat one part of such a house to a different temperature than the other part.

Recently, the "heat pump" method of home heating has been enlarged to include the heating of water for use in the home. With the present invention, the water heater could be operated at a higher temperature than would normally be required by the space heaters without penalizing the system as a whole. Plural discharge ports would provide the necessary temperature differential.

Another example of plural port heating relates to certain manufacturing processes such as blood plasma, biologicals, and the like wherein vacuum drying, or concentration is a requirement. In this application, the heat input into the material being processed within the vacuum chamber is usually carefully controlled relative to both temperature and quantity. Often, different temperatures are required as the processing progresses. Again plural porting can provide different heating temperatures as well as different cooling temperatures, and at various volumes.

Still another use of plural discharge ports to provide the means for two-temperature heating occurs in the cooling phase of true summer air conditioning. In many such installations served by large central systems, reheating is a regular part of the cooling function. Here the treated air may leave the dehumidifying phase at a temperature too low for the requirement; therefore, reheating up to the wanted temperature is common practice.

One example of an application where a single motor-compressor may be required to provide the means to supply two-temperature cooling and simultaneously supply two-temperature heating is found in a year-round, central, home air conditioning system. In this case one system would automatically supply summer cooling and winter heating. In summer, more cooling and a lower temperature may be required in the kitchen than elsewhere. At the same time, the usual hot water is needed. During seasonal changes, spring and fall, some areas may require heat while other areas would simultaneously need cooling. In winter, some cooling may be required along with heating, particularly if additional food storage space has been added to the home.

Another problem with prior art positive-displacement motor-compressors was that they required either an inlet valve, a discharge valve, or both. Being moving parts, the valves were subject to many types of trouble. The present invention has made it possible to do away with inlet and discharge valves and to replace them with simple ports. The motor-pump or motor-compressor of this invention has operated successfully in a refrigeration system that had no valve of any kind anywhere in the system.

Other objects and advantages of the invention will appear from the following description of a preferred embodiment thereof which will be described in detail in order to comply with the requirements of U. S. revised statutes, Section 4888. It should be understood that the details are illustrative and are given as examples and are not intended to narrowly limit the scope of the invention.

In the drawings:

Fig. 1 is a reduced view in perspective of a motor compressor embodying the principles of the present invention.

Fig. 2 is a view, enlarged with respect to Fig. 1, in section of the motor pump of Fig. 1. The view is taken along the line 2—2 in Fig. 3.

Fig. 5 is a view in end elevation of the two pumping elements alone, with some diagrammatic reference lines and curves inserted.

Fig. 6 is a view in end elevation of an end plate having two separated intake ports in accordance with the principles of the present invention.

Fig. 7 is a top plan view of the end plate shown in Fig. 6 with conduits attached to the outer surface thereof.

Fig. 8 is a view in end elevation of an end plate having two separated discharge ports according to the principles of this invention.

Fig. 9 is a top plan view of the end plate shown in Fig. 8 with the conduits attached thereto being broken off.

Fig. 10 is a somewhat diagrammatic superposition of the gears of Fig. 5 on the plural intake porting of Fig. 6, showing the relationship of the ports to the gears.

Fig. 11 is a similar superposition of the plural discharge porting of Fig. 8 on the gears of Fig. 5.

Fig. 12 is a diagrammatic view illustrating an application of a compressor having plural intake ports in accordance with the principles of the invention.

Fig. 13 is a diagrammatic view similar to Fig. 12 illustrating an application of a compressor having plural discharge ports.

Fig. 14 is a view similar to Figs. 12 and 13 showing an application of a compressor having plural intake ports and plural discharge ports.

Figure 3:
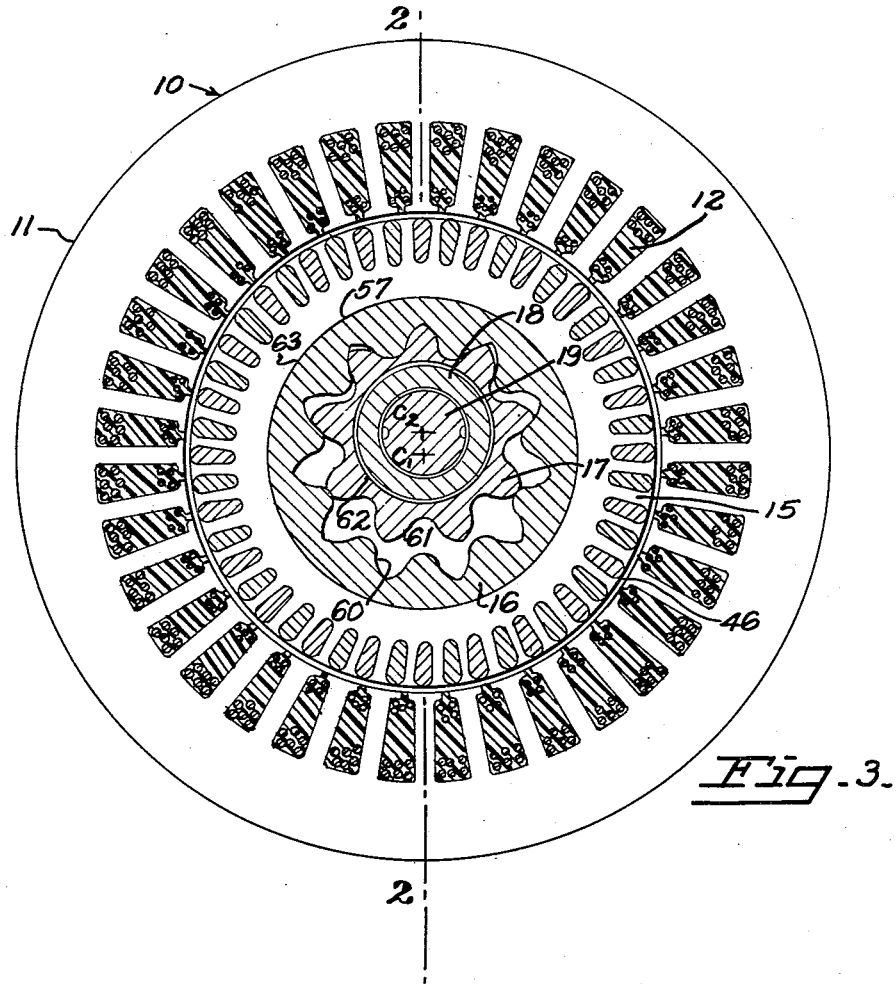
Fig. 3 is a view in section taken along the line 3—3 of Fig. 2.

The compressor 10 is generally similar to that disclosed in my co-pending application, Serial No. 279,392, filed March 29, 1952, except principally for the plural porting. It should be understood that although in the drawings a stator 11 impregnated with plastic 12 is shown, in order to provide the pressure vessel, the present invention may be used with the stator shown in application Serial No. 286,880, filed May 9, 1952, or with the sleeve construction shown in application Serial No. 302,099, filed August 1, 1952. The present invention can be used with any type of pressure vessel.

In addition to the stator 11, the compressor 10 includes a pair of end plates 13 and 14. Inside the stator 11 and between the end plates 13, 14 are a hollow rotor 15, an outer gear or pump element 16 secured to the inside of the rotor 15, and an inner gear or pump element 17. The inner gear 17 is inside the outer gear 16 and rotates around an axis $C_2$ eccentric to the axis $C_1$ of the rotor 15 and the outer gear 16. The inner gear pump element 17 is supported by a stationary bearing member 18 which encircles the single stationary bolt 19. When the rotor 15 rotates, the outer gear 16 drives the inner gear 17 and causes fluid to flow from the compressor intake opening to the compressor discharge, the structure of which will be explained below.

The end plates 13 and 14

The stationary end plates 13 and 14 perform many functions in this device. They support the rotor 15, close off both ends of the gear pump elements 16 and 17, fix the meshing relationship between the gears 16 and 17, as shown by centers $C_1$ and $C_2$, maintain uniform and parallel spacing between the rotor 15 and the stator 11, close both ends of stator 11, provide intake and discharge ports, provide means for connecting suitable conduits to the ports, and may provide the support means for the whole motor-compressor 10. The end plates 13 and 14 are also recessed and drilled in certain places to provide grooves and passages that are part of the lubrication system of the motor-compressor 10.

Fig. 6 shows an end plate 13 which may be used on the intake side of the compressor 10. The end plate 13 is characterized by two intake ports 20 and 21 which are separated from each other, not only by the wall of the end plate 13, but also by the construction of the pump elements 16 and 17 themselves in a manner which will be described later. For the present it is sufficient to note that the imperforate portion 22 on the end plate 13 between the intake port 20 and the intake port 21 is wide enough so that there is no connection between the openings 20 and 21. The opening 20 is shown as smaller than the opening 21 and as located closer to the point of full mesh where the pump elements 16 and 17 are completely closed than is the intake opening 21.

A better understanding of the double intake porting of Fig. 6 may be seen by considering Figs. 5 and 10. In Fig. 5, only the two gears 16 and 17 are shown, and, for the moment, clockwise rotation will be assumed. The lines A, B and D, projecting radially from the pinion gear center $C_2$, indicate the functional division of the gear pumping elements into three roughly equal sections AB, BD, and DA of approximately 120° each. In the section AB suction occurs; the section BD is an idle section where no pumping action occurs; and the section DA is where compression occurs.

A crescent shaped area E has been drawn in the section BD to outline an area where the teeth of the gears 16 and 17 never contact each other. This open crescent E is a void; there is no solid, stationary member interposed between the gears at open mesh as is the case in some pumps; in those pumps that is where the work is done. Here no work is done in the idle section BD.

In the suction section AB, tooth contact is continuous between a point 23 on line A and a point 24 on line B, where contact is lost. In the idle section BD tooth contact is absent, the path of the gear teeth in this section being outlined by the two arcs of the crescent E. In the compression section DA tooth contact is first re-established along line D at a point 25 and is continuous to the point 23 on line A. Full mesh between the gears 16 and 17 occurs at the point 23, and since the teeth of the pinion 17 fit almost perfectly into the tooth spaces of gear 16, clearance volume very nearly approaches zero. A pressure seal divides the low pressure section AB from the high pressure section DA at point 23 along a line perpendicular to line A and to the plane of the drawing, and this dividing line is usually referred to as the seal line. In the suction end plate Fig. 6 the compressor gears 16, 17 would be rotating in a counterclockwise direction. At the point 23, the gears 16 and 17 are at full mesh position. As the gear elements 16, 17 rotate beyond the point 23, a cavity between the meshing teeth begins to open to form a confined cavity which continuously expands in volume up to the point 24. The partially open, expanding cavity passes first over the intake port 20 where it fills with vapor. After leaving the port 20, the expanding cavity is cut off from port 20 and the supply of vapor there, but it continues to expand as the gears are rotated through the distance 22 separating the first suction port 20 from the second suction port 21. Upon arrival at the port 21 a pressure reduction within the cavity will have occurred, thus permitting the cavity to accept additional vapor as it passes over port 21. However, since the cavity already holds that vapor received from the first suction port 20, only sufficient vapor will enter the cavity from port 21 to satisfy the pressure reduction which occurred during cavity expansion across imperforate area 22. It therefore becomes evident that it will normally be preferable to operate the second intake port 21 at a higher pressure than the first intake port 20.

Any change of intake ports 20 and 21 with respect to their angular distance from the full mesh point 23 or with respect to the imperforate area 22 will change the pressure and/or volume of the vapor entering the confined, expanding tooth cavities during intake. Those skilled in the art will find it simple to design intake ports with respect to area, shape, and angular location from the seal line to achieve whatever suction pressure differences and/or volume ratios between the respective ports that may be desired in order to provide two-temperature refrigeration without compressor valves and without suction pressure control valves.

As shown in Fig. 7, and in dotted lines in Fig. 6, suitable conduits 27 and 28 may be secured to the respective intake ports 20 and 21.

Figs. 8 and 9 show an end plate 14 having two discharge ports 30 and 31 separated by an imperforate portion 32 of the wall of the end plate 14. Since both Figs. 6 and 8 are taken looking from the inside of the machine, it should be understood that they are symmetric views and that in Fig. 8 the gears 16 and 17 must be considered as moving in a clockwise direction, so that the tooth cavities close in a clockwise direction. Compression begins the instant when tooth contact is reestablished at the point 25. A given cavity at this instant of contact traps and confines vapor at the highest suction pressure. As the gear mesh progresses, that vapor trapped in the contracting cavity is compressed until the port 30 is reached, where only a part of the compressed vapor is discharged, as the cavity will have only partially closed. Discharge into the port 30 is cut off by the imperforate area 32 as the cavity leaves the port 30. The cavity, in passing across the imperforate area 32, continues to contract and therefore to compress the remaining vapor. Upon arrival at the port 31, where almost full tooth mesh occurs, all the remaining vapor is discharged into the port 31 at a higher pressure than the vapor discharged into the port 30.

Since the port 31 is very close to full mesh point 23, substantially all the vapor is discharged from the working cavity, thereby achieving an unusually close approach to zero clearance volume.

It will be seen that any change of the discharge port 30 with respect to its angular distance from the full mesh point 23 will result in changes of pressure and/or volume of the vapor discharged there from the contracting tooth cavity during compression. Those skilled in the art will find it simple to design discharge ports with respect to area, shape and angular location to achieve desirable discharge pressure differences and/or volume ratios between the respective ports to provide two-temperature heating without compressor valves and without discharge pressure control valves. Conduits 37 and 38 may be secured respectively to the ports 30 and 31 as shown in Fig. 9.

It should be understood that in any one compressor there may be an end plate 13 having two or possibly more intake ports and an end plate 14 having two, or possibly more, discharge ports; or only one of the two end plates may have plural porting and the other end plate may have a single port. These different conditions are illustrated in Figs. 12, 13, and 14, and will be discussed further after the other parts of the compressor have been discussed.

In their general shape, the end plates 13 and 14 are substantially identical, consisting basically of a stepped disc 40 having a wider diameter outer portion 41, and a narrow diameter inner portion 42. The outer portion 41 may have a stepped outer rim 43 that nests in the bore of the stator 11.

The inner disc portion 42 preferably terminates in a flat wall 44, which is preferably ground to insure that it has a perfectly plane surface. The periphery 45 of the portion 42 is concentric with the rim 43 and forms a bearing surface for rotatably supporting the motor rotor 15. The proportioning, spacing, and concentricity of the two peripheries 43 and 45 insure perfectly accurate alignment and spacing of the rotor 15 in the stator 11, so that the rotor 15 is perfectly aligned and spaced, enabling the clearance area or air gap 46 between the rotor 15 and the stator 11 to be very small. This assures uniform rotor-to-stator clearance and uniform rotor-to-stator parallelism.

The end plates 13, 14 may also be provided with an eccentrically located, preferably stepped, circular opening 50 whose center $C_2$ is radially offset with respect to the center $C_1$ of the rim 43 and the bearing surface 45. The amount of offset depends on the ratio circles of the gear teeth elements 16, 17 and all other related features of construction. The inner smaller diameter portion 51 of the opening 50 engages the cylindrical body of the through-bolt 19, which extends into the wider diameter portion 52 of the opening 50. Blind nuts 53 may be threaded on the outer ends of the bolt 19 so that the nuts 53 abut the shoulders 54 and thereby urge the end plates 13, 14 inwardly against the cylindrical bearing member 18. In this instance the nuts 53 are sealed in place by some of the plastic 12, but with a different type of pressure vessel there will be a different type of closure.

The motor rotor 15

The motor rotor 15 may be of the usual squirrel cage induction design having generally-annular projecting portions 55 at each end. Annular bearings 56 may be provided on the inner surface of the central rotor bore 57 to ride on the bearings 45.

The bearings 45 and 56 serve to locate the rotor 15 in relation to the stator 11 and thereby govern the air gap or clearance 46 between the parts. They also serve to position the rotor 15 along its proper axis so that it rotates truly about the center $C_1$.

The pump elements 16, 17 and the bearing 18

The outer pump element 16 may be press fitted or otherwise secured to the rotor 15 in the bore 57 so that it becomes essentially integral with the rotor 15. In the drawings a hollow gear type of a pump element 16 is shown with a toothed inner surface 60.

The inner gear element 17 comprises a hollow cylindrical member having a toothed outer surface 61 driven by the toothed inner surface 60 of the outer element 16.

It will be obvious that the two pump elements 16, 17 rotate around different centers. The inner element 17 rotates around the center $C_2$, and is made perfectly true and cylindrical so far as itself is concerned, its bore 62 and its teeth 61 being perfectly concentric. Similarly, the outer periphery 63 of the outer element 16 and its teeth 60 are perfectly concentric, but the outer element 16 rotates around the center $C_1$ because it is fastened to the rotor 15 and rotates therewith.

Preferably the inner and the outer gear elements 17 and 16 are of the so-called "Rotoid" type, that is, they preferably have an odd number of teeth, with the outer element 16 having two more teeth than the inner element 17. The teeth are preferably further constructed so that there is a sliding contact between the inner and outer elements 17, 16 which is not broken over a considerable arc as the gears rotate. In the form of pump shown in the drawings, this arc will be about 240°, with the open crescent space E shown in Fig. 5 being about 120°. No claim is made herein to the "Rotoid" gears per se, but only to their combination with the other elements shown. The "Rotoid" elements themselves are described and claimed in Patent #2,547,392, issued April 3, 1951, to Myron F. Hill and Francis A. Hill, II. In place of these "Rotoid" elements, the "Gerotor" elements, also patented by the Hills, may be used, or multi-vane rotary elements may be used, but the results given by "Rotoids" appear to be more satisfactory, according to present indications.

Between the inner gear element 17 and the bolt 19 is the cylindrical stationary bearing 18 which also acts as a stop and accurately spaces apart the end plates 13, 14, the nuts 53 being tightened on the bolt 19 until the flat surfaces 44 of both end plates 13, 14 are in tight contact with the radial faces 65 of the bearing, thereby placing the bearing under compression. The radial end faces of the gears are spaced apart from the end plate surfaces 44 enough to provide a running clearance. For this purpose they are made almost, but not quite, as long as the bearing 18. A clearance of 0.0003 inch at each end has been used successfully. The bearing 18 is preferably cylindrical and its inner surface 66 and outer surface 67 are concentric. The central portion 68 of the outer surface 67 is relieved, and suitable lubrication grooves and bores may be provided, as described in application Serial No. 286,880.

As has been stated earlier, the bolt 19 and the bearing 18 are stationary, as are the end plates 13, 14 and the stator 11. There is no rotating shaft or rotating shaft seal. The rotor 15 and the outer gear element 16, being fixed together, form one rotating element, and the inner gear element 17 is the only other rotating member. The position of the bolt 19 determines the center of rotation $C_2$ of the inner gear element 17, and the positioning of the bolt 19 is determined by the construction of the end plates 13, 14. Thus the end plates 13, 14 must be made carefully in order to provide exactly the right eccentricity between the centers $C_1$ and $C_2$. When the end plates 13, 14 are properly constructed, the motor compressor 10 is readily assembled; moreover, the proper location of the intake and discharge ports is assured.

Assembly of the motor compressor 10

A preferred way of assembling the motor compressor 10 is to first thread one blind nut 53 to one end of the through-bolt 19 and then to pass the through-bolt 19 through the opening 50 in one end plate 13. Then the hollow cylindrical bearing 18 may be placed around the through-bolt 19 and the inner gear 17 may be placed around the bearing 18. The rotor 15, with the outer gear 16 secured to it, may then be placed over the inner gear 17, the motor rotor bearings 56 being set to fully engage the bearing surface 45 on the end plate 13. The other end plate 14 may then be placed over the projecting bolt 19 and guided by the bolt 19 until its bearing 45 is in full engagement with the motor rotor bearing 56. The other blind nut 53 may then be threaded on its end of the bolt 19 and drawn up with sufficient tension to achieve slight compression of the hollow cylindrical spacer bearing 18 between the end plates inner faces 44. This "pump package" may then be slid into the stator 11, completing the assembly of the motor-compressor 10. Plastic sealing may then be applied, where other forms of sealing (e. g. O rings) are not used.

Operation

Figure 4:
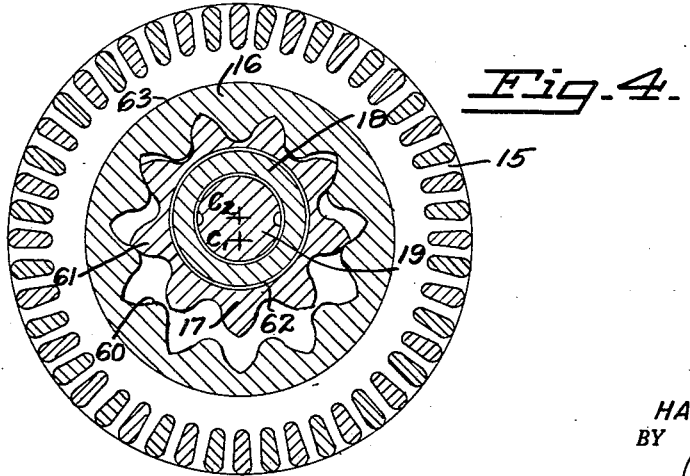
Fig. 4 is a view in section of the rotor of Fig. 3 with the pump gears rotated through a relatively small angle.

When an electric current is applied to the windings of the stator 11, the rotor 15 will rotate on its bearings 56, 45. The outer pump element 16 being rigidly mounted to the rotor 15 will then drive the inner pump element 17, and fluid will be drawn in from the intake side of the compressor and expelled through the discharge side. The reason the fluid will be moved is fully explained in the Hill patent mentioned above and can be seen from Figs. 3, 4, and 5 of the drawings, the present invention being an improvement over the Hill patents in that its Rotoid gears do not require any rotating shaft.

As stated earlier, the invention may be practiced in a compressor having plural intake ports and a single discharge port (see Fig. 12), in a compressor having a single intake port and plural discharge ports (see Fig. 13), or in a compressor having plural intake ports and plural discharge ports (see Fig. 14). In any event, the operation of the plural porting is substantially the same.

The operation of plural intake ports 20 and 21 will be considered first. In the interest of clarity, reference will be had to Fig. 10 where the suction ports of Fig. 6 are so superimposed on the gear elements of Fig. 5 that the gears 16, 17 rotate clockwise, as in Figs. 5 and 11, the inner gear 17 being driven through and by the outer gear 16. It will be seen that a given tooth cavity at point 23 along line A is at full mesh and is therefore completely closed. When the gears 16, 17 are rotated, a cavity 70 will begin to open between the gear teeth, and when rotation is continued it will soon occupy the position of cavity 71 centrally located over the first suction port 20. It will be seen that the cavity will have expanded from zero volume to about one-third of its maximum volume. Since a pressure exists in the port 20, the cavity 71 will receive a charge of vapor at that pressure. If the gears 16, 17 are again rotated this cavity will occupy the position of the cavity 72 which is cut off from the port 20 by the imperforate area 22. Since no vapor can enter the cavity during its rotation and further expansion across the imperforate area 22, it arrives at and opens into the open area 73 at a lower pressure than that of the first port 20. Since a pressure exists in the port 21 the cavity 73 will accept an additional charge of vapor proportional to the cavity expansion across the imperforate area 22. However, since the cavity already holds that vapor it received from the first port 20 when it arrives at the port 21, the second port 21 is preferably operated at a higher intake pressure than the first port 20. Also, the pressure of the port 20 is isolated from the pressure of the port 21 by the width of imperforate area 22. No tooth cavity can bridge this area; therefore the port 20 is never connected with the port 21. Thus, the teeth of the pumping elements 16 and 17 form a series of isolated and separate expanding chambers, formed by the continuous traveling contacts of the gears.

The operation of the idle zone or section BD of the gear pumping elements will next be considered. In Fig. 5 pumping action is present and is continuous throughout approximately 240° of rotation from the point 25 on the line D around to the point 24 on the line B (clockwise rotation). Throughout this 240° of rotation all of the teeth of both gears 16, 17 included in this 240° zone are mating with each other, making unbroken, continuous traveling contact and forming a series of separated and isolated tooth cavities. An idle, non-pumping section BD between point 24 and point 25 includes the crescent shaped area E. No work is done in this section because there is no tooth contact here. This idle zone BD where no pumping action occurs corresponds to the open area 73 which extends approximately 120° of rotational arc. However, an intake port 21 may open into this idle zone BD, because the pressure is substantially uniform over the idle zone. It will be obvious that if a port opens into any portion of the open area 73, it might as well extend across the whole area.

The operation of the compression zone DA with plural discharge porting will next be considered, although it will be obvious that there may be only one discharge port just as there may be only one intake port. So long as the plural porting occurs on either side of the motor compressor, this invention may be practiced. Consideration of the plural discharge porting will be made easier by considering Fig. 11 which is a superposition of Figs. 5 and 8, with the gears still considered as rotating in a clockwise direction.

At the point 25 contact is reestablished between the teeth, and continuously contracting chambers are formed, the first chamber 74 being formed when the vapor is at maximum volume. As the gears continue to rotate, the chamber 74 contracts, thereby compressing the entrapped vapor. Discharge into the port 30 first occurs when the leading edge of chamber 74 enters the port area. Vapor discharge continues in the chamber 75 until it is rotated up to a point where the following edge of the chamber leaves the port area, which point is the cut-off point of port 30. The chamber will have contracted to about one-third of its maximum volume at the port 30 cut-off. That portion of compressed vapor remaining in the chamber is subsequently expelled into the port 31 by a second and separate discharge at a preferably higher pressure, when the leading edge of the chamber 76 begins to enter the area of port 31. At no time are the discharge ports 30 and 31 interconnected. The imperforate area 32 separating these ports cannot be bridged by the gear chamber. Discharge into the port 31 continues as the chamber rotates up to and considerably past position 76 to a point where the following edge of the chamber leaves the port area. In this case, the chamber arrives at the full mesh point 23 before the cut-off point of port 31 is reached. It therefore becomes clear that the last bit of compressed vapor is squeezed out of the chamber as it leaves the port 31 because full mesh occurs before cut-off.

*Example of application of plural intake porting (Fig. 12)*

One type of installation employing the principles just discussed is illustrated in Fig. 12. Here a low temperature evaporator 100 (e. g., for a freezer compartment to be maintained at −10° F.) and a higher temperature evaporator 101 (e. g., for a general food storage compartment to be maintained at 40° F.) are both operated from one compressor 102. A single discharge conduit 103 conducts vapor at high pressure from the single compressor discharge port 104 to a condenser 105 where condensation occurs (e. g., at about 115° F.). From the condenser 105 the fluid, now in liquid state, flows through a single conduit 106 to a T 107 where the liquid is divide into two streams. One conduit 108 leads from the T 107 to the low temperature evaporator 100, through a suitable restricting device, such as a capillary tube 109 or expansion valve (not shown). The other conduit 110 leads from the T 107 to the higher temperature evaporator 101, via a capillary tube 111 of a different diameter or a different length from the tube 109, or via an expansion valve (not shown).

From the low temperature evaporator 100, a conduit 112 conducts the vapor at a low pressure (e. g., about 19 p. s. i. a.) into the first intake port 113 of the compressor 102. A separate conduit 114 conducts the vapor from the higher temperature evaporator 101 directly to the second intake port 115 of the same compressor 102 at a higher pressure (e. g., about 52 p. s. i. a.). The important thing to note here, is that there is no suction pressure control valve or any other valve between the outlet from the higher temperature evaporator 101 and the second intake port 115; whereas, in the prior art there was always a suction pressure control valve or like device to prevent the 52-pound pressure in the higher temperature evaporator 101 from falling to the 19-pound pressure of the lower temperature evaporator 100. The plural intake porting of the present invention solves this problem and achieves the two different pressures required. Instead of having a suction pressure control valve in the conduit, the compressor itself creates, maintains, and separates the two pressure systems.

*Example of application of plural discharge porting (Fig. 13)*

Fig. 13 shows a heating system where plural discharge ports are employed to give two different temperatures from a single compressor 120. Vapor (e. g., Freon–12) from a low-temperature evaporator 121 enters the compressor 120 through the single intake port 122 at a relatively low pressure and a relatively low temperature (e. g., 36 p. s. i. a. at 20° F.). It is compressed, as already described herein, and issues at two different pressures and therefore two different temperatures from the two discharge ports 123 and 124. For example, the first, lower-temperature, lower-pressure port 123 may supply vapor at 110° F. and 151 p. s. i. a. to a condenser 125 (e. g., a wall radiator), while the second, higher-temperature, higher-pressure port 124 may supply vapor at 130° F. and 195 p. s. i. a. to a second condenser 126 (e. g., a forced air radiator). In the wall radiator 125 the vapor is condensed, thereby giving up heat energy, and the resultant liquid passes out through a suitable float or bellows actuated trap 127. Similarly the liquid condensed in the forced air radiator 126 passes out through a similar trap 128, and the two streams of liquid then join in a common conduit 129 supplying the evaporator 121.

Heretofore, where a single compressor was used, the vapor issued from the compressor at only one temperature and one pressure, which was necessarily the higher temperature and higher pressure. Therefore, a valve was required to reduce some portion of the vapor to a lower pressure suitable for the lower temperature radiator. The present invention of plural discharge porting supplies both pressures without having such a valve. Therefore, the extra work formerly necessary to raise both portions of the fluid to the higher level is eliminated, and a higher coefficient of performance is obtained.

*Example of application of a compressor having both plural intake porting and plural discharge porting*

Fig. 14 shows one compressor 130 used in a system to provide both heating and cooling simultaneously. For example, the one compressor 130 may be used to provide the heat for a hot water heater 131 at 140° F., the heat for a space heater 132 at 120° F., the cooling for a home freezer 133 at 0° F., and the cooling for a general storage refrigerator 134 (or in summer, when the space heater is not being used, for a home air conditioner) at 35° F. Again the fluid may be Freon–12.

The first (low-pressure) discharge port 135 may supply vapor at 120° F. and 172 p. s. i. a. to the space heater (condenser) 132. The liquid condensate may then pass through a trap 136 and from there go into the low temperature evaporator (or freezer) 133 at 0° and 24 p. s. i. a. The evaporated vapor may then pass back into the compressor 130 through the first (low-pressure) intake port 137.

The second (high-pressure) discharge port 138 may supply vapor at 140° F. and 220 p. s. i. a. to the hot water heater (condenser) 131. The liquid condensate may pass out through a trap 139 and be conducted to the refrigerator or air conditioner (evaporator) 134 at 35° F. and 47 p. s. i. a. The vapor re-enters the compressor 130 through the second (higher pressure) suction port 140.

Heretofore, both a suction pressure control valve and a pressure-reduction valve would have been a necessity in any such system run from a single compressor. The present invention not only eliminates both valves but also gives a greatly improved co-efficient of performance. Instead of a 196-pound pressure rise with a compression ratio of about 8 to 1, we have two pressure rises of 148 pounds and 173 pounds with compression ratios of about 5 to 1 and 7 to 1 respectively.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A compressor, comprising a pressure vessel; means for forming a plurality of continuously expanding chambers inside said pressure vessel; means forming a single unobstructed neutral chamber where no work is done into which said chambers successively merge; and, with said first-named means, constituting the intake side of said compressor; means for forming a plurality of continuously contracting chambers emerging from said neutral chamber inside said pressure vessel, constituting the discharge side of said compressor; a plurality of wholly independent stationary valveless ports through the walls of said pressure vessel on the discharge side of said compressor, said ports being so spaced that no chamber can at any time bridge between said ports for discharge of fluid at different pressures through each said port, each said port having a diameter smaller than the length of each chamber that passes said port; at least one valveless port on the intake side of said compressor, so that fluid may be moved into, through, and out from said compressor; and a separate conduit directly connected to each of said ports.

2. A valveless motor-compressor comprising a pressure vessel: two toothed rotors inside said pressure vessel with one rotor inside the other, with their axes eccentric to each other and their teeth facing each other, said rotors being of the type maintaining continuous contact over a portion only of their rotational circle, said continuous contact portion including a point of full mesh so that between one side of said point of full mesh and another point continuously expanding chambers are formed between said teeth constituting the intake side of said motor-compressor, and so that continuously contracting chambers are formed between said teeth on the other side of said point of full mesh, constituting the discharge side of said motor-compressor; a single unobstructed neutral chamber between said intake side and said discharge side opposite said point of full mesh, where the facing teeth are unengaged with any element of the compressor and where no work is done, into which said continuously expanding chambers successively merge and from which said continuously contracting chambers successively emerge; a plurality of wholly independent stationary valveless ports through said pressure vessel, communicating between the outside of said pressure vessel and chambers on one side of said motor-compressor, said ports being so spaced that no chamber can at any time bridge between them, whereby the fluid at said ports is moved at different pressures; at least one valveless port on the other side of said motor-compressor so that fluid may be moved through said motor compressor, one of said ports being in said neutral chamber; and a separate conduit directly connected to each of said ports.

3. The motor-compressor of claim 2 in which said plurality of ports are on the intake side of said compressor.

4. The motor-compressor of claim 2 in which the plurality of ports are on the discharge side of said motor-compressor.

5. A valveless motor-compressor comprising a pressure vessel: two toothed rotors inside said pressure vessel with one rotor inside the other, with their axes eccentric to each other and their teeth facing each other, both said rotors having an odd number of teeth, the outer rotor having two more teeth than the inner rotor, said rotors being of the type maintaining continuous contact over a portion only of their rotational circle, said continuous contact portion including a point of full mesh so that between one side of said point of full mesh and another point continuously expanding chambers are formed between said teeth constituting a portion of the intake side of said motor-compressor, and so that continuously contracting chambers are formed between said teeth on the other side of said point of full mesh, constituting the discharge side of said motor-compressor; a single open neutral chamber between said intake side portion and said discharge side and completing said intake side opposite said point of full mesh, where the facing teeth are unengaged with any element of the compressor and where no work is done; a plurality of wholly independent stationary valveless ports through said pressure vessel, communicating between the outside of said pressure vessel and the intake side of said motor-compressor, said ports being so spaced that no chamber can at any time bridge between them, only one of said ports opening into said neutral chamber, whereby the fluid at said ports is at different pressure levels; at least one port on the discharge side of said motor-compressor so that fluid may be moved through said motor-compressor; and a separate conduit directly connected to each of said ports.

6. The motor-compressor of claim 5 in which there are two wholly independent stationary discharge ports, spaced so that no chamber can bridge them, one of said discharge ports being located closely adjacent said point of full mesh.

7. A valveless compressor, comprising a pressure vessel; means for forming a plurality of continuously expanding chambers inside said pressure vessel; means forming a single unobstructed neutral chamber, where no work is done, into one end of which said expanding chambers successively merge and constituting, with said first-named means, the intake side of said compressor; means following the opposite end of said neutral chamber for forming a plurality of continuously contracting chambers inside said pressure vessel emerging from said neutral chamber, constituting the discharge side of said compressor; a plurality of independent valveless ports through the walls of said pressure vessel on the intake side of said compressor, one only of said ports opening into said neutral chamber, said ports being so spaced that no chamber can at any time bridge between said ports, whereby fluid is taken in through said ports at pressures different from each other; at least one port on the discharge side of said compressor, so that fluid may be moved into, through, and out from said compressor; and a separate conduit directly connected to each of said ports.

8. A closed vapor compression system, including in combination: a valveless motor-compressor comprising a pressure vessel, two toothed rotors inside said pressure vessel with one rotor inside the other, with their axes eccentric to each other and their teeth facing each other, both said rotors having an odd number of teeth, the outer rotor having two more teeth than the inner rotor, said rotors being of the type maintaining continuous contact over a portion only of their rotational circle, said continuous contact portion including a point of full mesh so that between one side of said point of full mesh and another point continuously expanding chambers are formed between said teeth constituting a first side of said motor-compressor, and so that continuously contracting chambers are formed between said teeth on the other side of said point of full mesh, constituting a second side of said motor-compressor, a plurality of wholly independent stationary valveless ports through said pressure vessel, communicating between the outside of said pressure vessel and one side of said motor-compressor, said ports being so spaced that no chamber can at any time bridge between them, whereby the fluid at said ports is at different pressure levels, at least one port on the other side of said motor-compressor so that fluid may be taken in, moved through and discharged from said motor-compressor; a fluid-condensing means connected directly to each discharge port without intervening valves; fluid-evaporating means connected directly to each intake port; and liquid control means connected between said condensing means and said evaporating means.

9. A cooling system, including in combination: a valveless motor-compressor comprising a pressure vessel, two toothed rotors inside said pressure vessel with one rotor inside the other, with their axes eccentric to each other and their teeth facing each other, both said rotors having an odd number of teeth, the outer rotor having two more teeth than the inner rotor, said rotors being of the type maintaining continuous contact over a portion only of their rotational circle, said continuous contact portion including a point of full mesh so that between one side of said point of full mesh and another point continuously expanding chambers are formed between said teeth, constituting a portion of the intake side of said motor-compressor, and so that continuously contracting chambers are formed between said teeth on the other side of said point of full mesh, constituting the discharge side of said motor-compressor, a single open neutral chamber between said intake side portion and said discharge side completing said intake side, opposite said point of full mesh, where the facing teeth are unengaged with any element of the compressor and where no work is done, two wholly independent stationary valveless ports through said pressure vessel, communicating between the outside of said pressure vessel and the intake side of said motor-compressor, said ports being so spaced that no chamber can at any time bridge between them, only one of said ports opening into said neutral chamber, whereby the fluid at said ports is at different pressure levels, at least one valveless port on the discharge side of said motor-compressor so that fluid may be moved through said motor-compressor; a fluid condenser connected directly to said valveless discharge port; two fluid evaporators, one connected directly to each valveless intake port; a conduit leaving the condenser and divided into two conduits; and two liquid control means, one in each said latter conduit and connected to one said evaporator.

10. A heating system, including in combination: a valveless motor-compressor comprising a pressure vessel, two toothed rotors inside said pressure vessel with one rotor inside the other, with their axes eccentric to each other and their teeth facing each other, both said rotors having an odd number of teeth, the outer rotor having two more teeth than the inner rotor, said rotors being of the type maintaining continuous contact over a portion only of their rotational circle, said continuous contact portion including a point of full mesh so that between one side of said point of full mesh and another point continuously expanding chambers are formed between said teeth constituting the intake side of said motor-compressor, and so that continuously contracting chambers are formed between said teeth on the other side of said point of full mesh, constituting the discharge side of said motor-compressor, two wholly independent stationary valveless ports through said pressure vessel, communicating between the outside of said pressure vessel and the discharge side of said motor-compressor, said ports being so spaced that no chamber can at any time bridge between them, one port on the intake side of said motor-compressor so that fluid may be moved through said motor-compressor; two fluid condensers, one connected directly to each said discharge port; a fluid evaporator means connected directly to said intake port; two liquid control means, one connected to each said condenser; and a conduit joining both said liquid control means and said evaporating means.

11. A combined heating and cooling system in which useful heating and cooling occur simultaneously, including in combination: a valveless motor-compressor comprising a pressure vessel, two toothed rotors inside said pressure vessel with one rotor inside the other, with their axes eccentric to each other and their teeth facing each other, both said rotors having an odd number of teeth, the outer rotor having two more teeth than the inner rotor, said rotors being of the type maintaining continuous contact over a portion only of their rotational circle, said continuous contact portion including a point of full mesh so that between one side of said point of full mesh and another point continuously expanding chambers are formed between said teeth constituting a first portion of the intake side of said motor-compressor, and so that continuously contracting chambers are formed between said teeth on the other side of said point of full mesh, constituting the discharge side of said motor-compressor, a single open neutral chamber between said first intake side portion and said discharge side opposite said point of full mesh, constituting a second intake side portion, where the facing teeth are unengaged with any element of the compressor and where no work is done, two wholly independent stationary valveless ports through said pressure vessel, communicating between the outside of said pressure vessel and the intake side of said motor-compressor, said ports being so spaced that no chamber can at any time bridge between them, only one of said ports opening into said neutral chamber, whereby the fluid at said ports is at different pressure levels; two wholly independent stationary valveless ports on the discharge side of said motor-compressor, said discharge ports being so spaced that no chamber can at any time bridge between them, one of said discharge ports lying closely adjacent said point of full mesh; two fluid condensers, one connected directly to each said discharge port; two fluid evaporators, each connected to one said condenser and directly to one said intake port; and two liquid control means, one between each said condenser and its associated evaporator.

12. A closed vapor-compression system, including in combination a compressor, having a pressure vessel, means for forming a plurality of continuously expanding chambers inside said pressure vessel constituting the intake side of said compressor, means for forming a plurality of continuously contracting chambers inside said pressure vessel, constituting the discharge side of said compressor, a plurality of ports through the walls of said pressure vessel communicating with the chambers on one side of said compressor, said ports being so spaced that no chamber can at any time bridge between said ports, and at least one port on the other side of said compressor, so that fluid may be moved into, through, and out from said compressor; fluid condensing means connected directly to each discharge port for valveless operation therewith; fluid evaporating means connected to said condensing means and directly to each said intake port for valveless operation therewith; and liquid control means between said condensing means and said evaporating means.

13. A cooling system, including in combination a compressor, having a pressure vessel, means for forming a plurality of continuously expanding chambers inside said pressure vessel constituting the intake side of said compressor, means for forming a plurality of continuously contracting chambers inside said pressure vessel, constituting the discharge side of said compressor, two spaced-apart ports through the walls of said pressure vessel on the intake side of said compressor, said ports being so spaced that no chamber can at any time bridge between said ports, and one port on the discharge side of said compressor, so that fluid may be moved into, through, and out from said compressor; a fluid condenser connected directly to said discharge port for valveless operation therewith; two fluid evaporators, one connected directly to each said intake port for valveless operation therewith; a conduit leaving the condenser and divided into two conduits; and two liquid control means, one in each said latter conduit and connected to one said evaporator.

14. A heating system, including in combination a compressor, having a pressure vessel, means for forming a plurality of continuously expanding chambers inside said pressure vessel constituting the intake side of said compressor, means for forming a plurality of continuously contracting chambers inside said pressure vessel, constituting the discharge side of said compressor, two spaced-apart ports through the walls of said pressure vessel on the discharge side of said compressor, said ports being so spaced that no chamber can at any time bridge between said ports, and one port on the intake side of said compressor, so that fluid may be moved into, through, and out from said compressor two fluid condensers, one connected directly to each said discharge port for valveless operation therewith; a fluid evaporator means connected directly to said intake port for valveless operation therewith; two liquid control means, one connected to each said condenser, and a conduit joining both said liquid control means and said evaporating means.

15. A combined heating and cooling system in which useful heating and cooling occur simultaneously, including in combination a compressor, having a pressure vessel, means for forming a plurality of continuously expanding chambers inside said pressure vessel constituting the intake side of said compressor, means for forming a plurality of continuously contracting chambers inside said pressure vessel, constituting the discharge side of said compressor, two spaced-apart ports through the walls of said pressure vessel on said intake side of said compressor, said ports being so spaced that no chamber can at any time bridge between said ports, two spaced-apart ports on the discharge side of said compressor, said ports being so spaced that no chamber can at any time bridge between said ports; two fluid condensers, one connected directly to each said discharge port for valveless operation therewith; two fluid evaporators, each connected to one said condenser and directly to one said intake port for valveless operation therewith; and two liquid control means, one between each said condenser and its associated evaporator.

16. A closed vapor compression system, including in combination a compressor having a pressure vessel, two toothed rotors inside said pressure vessel with one rotor inside the other, their axes being eccentric to each other, said rotors being of the type maintaining continuous contact over a portion of their rotational circle, said continuous contact portion including a point of full mesh so that, between one side of said point of full mesh and another point, continuously expanding chambers constituting the intake side of said compressor are formed between said teeth due to the continuous traveling contacts thereof, and so that continuously contracting chambers constituting the discharge side of said compressor are formed between said teeth on the other side of said point of full mesh, a plurality of ports through said pressure vessel communicating with the chambers on one side of said compressor, said ports being so spaced that no chamber can at any time bridge between said ports, and at least one port on the other side of said compressor so that a fluid may be moved into, through, and out from said compressor; fluid condensing means connected directly to each discharge port; fluid evaporating means connected to said condensing means and directly connected to each intake port; and liquid control means between said condensing means and said evaporating means.

17. A cooling system, including in combination a compressor having a pressure vessel, two toothed rotors inside said pressure vessel with one rotor inside the other, their axes being eccentric to each other, said rotors being of the type maintaining continuous contact over a portion of their rotational circle, said continuous contact portion including a point of full mesh so that between one side of said point of full mesh and another point continuously expanding chambers constituting the intake side of said compressor are formed between said teeth due to the continuous traveling contacts thereof, and so that continuously contracting chambers constituting the discharge side of said compressor are formed between said teeth on the other side of said point of full mesh, two spaced apart intake ports through the walls of said pressure vessel on the intake side of said compressor, said ports being so spaced that no chamber can at any time bridge between said ports, and one discharge port on the discharge side of said compressor, so that fluid may be moved into, through and out from said compressor; a fluid condenser connected directly to said discharge port; two fluid evaporators, one connected directly to each said intake port; a conduit leaving the condenser and divided into two conduits; and two liquid control means, one in each said latter conduit and connected to one said evaporator.

18. A heating system, including in combination a compressor having a pressure vessel, two toothed rotors inside said pressure vessel with one rotor inside the other, their axes being eccentric to each other, said rotors being of the type maintaining continuous contact over a portion of their rotational circle, said continuous contact portion including a point of full mesh so that between one side of said point of full mesh and another point continuously expanding chambers constituting the intake side of said compressor are formed between said teeth due to the continuous traveling contacts thereof, and so that continuously contracting chambers constituting the discharge side of said compressor are formed between said teeth on the other side of said point of full mesh, two spaced apart discharge ports through the walls of said pressure vessel on the discharge side of said compressor, said ports being so spaced that no chamber can at any time bridge between said ports, and one intake port on the intake side of said compressor so that fluid may be moved into, through and out from said compressor; two fluid condensers, one connected directly to each said discharge port; a fluid evaporator means connected directly to said intake port; two liquid control means, one connected to each said condenser; and a conduit joining both said liquid control means and said evaporating means.

19. A combined heating and cooling system in which useful heating and cooling occur simultaneously, including in combination a compressor having a pressure vessel, two toothed rotors inside said pressure vessel with one rotor inside the other, their axes being eccentric to each other, said rotors being of the type maintaining continuous contact over a portion of their rotational circle, said continuous contact portion including a point of full mesh so that between one side of said point of full mesh and another point continuously expanding chambers constituting the intake side of said compressor are formed between said teeth due to the continuous traveling contacts thereof, and so that continuously contracting chambers constituting the discharge side of said compressor are formed between said teeth on the other side of said point of full mesh, two spaced apart intake ports through the walls of said pressure vessel on the intake side of said compressor, said ports being so spaced that no chamber can at any time bridge between said ports, two spaced apart discharge ports on the discharge side of said compressor, said ports being so spaced that no chamber can at any time bridge between said ports; two fluid condensers, one connected directly to each said discharge port; two fluid evaporators, each connected to one said condenser and directly to one said intake port; and two liquid control means, one between each said condenser and its associated evaporator.

References Cited in the file of this patent

UNITED STATES PATENTS

| 1,016,017 | Koltschanoff | Jan. 30, 1912 |
| 1,639,961 | Petersen | Aug. 23, 1927 |
| 1,682,564 | Hill | Aug. 28, 1928 |
| 1,804,604 | Gilbert | May 12, 1931 |
| 1,902,315 | Vogt | Mar. 21, 1933 |
| 1,912,738 | Svenson | June 6, 1933 |
| 1,938,203 | Witherell | Dec. 5, 1933 |
| 1,983,997 | Rolaff | Dec. 11, 1934 |
| 2,048,218 | Philipp | July 21, 1936 |
| 2,267,152 | Gygax | Dec. 23, 1941 |
| 2,301,496 | Aldrich | Nov. 10, 1942 |
| 2,309,797 | Stickel | Feb. 2, 1943 |

(Other references on following page)

UNITED STATES PATENTS

| | | |
|---|---|---|
| 2,375,319 | Muffly | May 8, 1945 |
| 2,385,905 | Yeomans | Oct. 2, 1945 |
| 2,393,223 | Rosen | Jan. 15, 1946 |
| 2,394,166 | Gibson | Feb. 5, 1946 |
| 2,513,984 | Witchger | July 4, 1950 |
| 2,547,392 | Hill et al. | Apr. 3, 1951 |
| 2,601,397 | Hill et al. | June 24, 1952 |
| 2,619,911 | Svenson | Dec. 2, 1952 |
| 2,630,759 | Mahlon | Mar. 10, 1953 |
| 2,639,855 | Daniels | May 26, 1953 |

FOREIGN PATENTS

| | | |
|---|---|---|
| 19,872 | Great Britain | Sept. 6, 1911 |
| 130,515 | Switzerland | Feb. 16, 1929 |
| 496,342 | Great Britain | Nov. 29, 1938 |
| 564,152 | Germany | Nov. 14, 1932 |
| 681,883 | Great Britain | Oct. 29, 1952 |